United States Patent
Sturm

Patent Number: 5,877,434
Date of Patent: Mar. 2, 1999

[54] YARN TENSION MEASURING DEVICE FOR AUTOMATIC RETURN OF YARN FOLLOWING A MOMENTARY LOSS OF TENSION

[75] Inventor: Christian Sturm, Krefeld, Germany

[73] Assignee: W. Schlafhorst AG & Co., Germany

[21] Appl. No.: 922,515

[22] Filed: Sep. 3, 1997

[30] Foreign Application Priority Data

Sep. 3, 1996 [DE] Germany .................. 196 35 695.4

[51] Int. Cl.⁶ ............................................. G01L 5/00
[52] U.S. Cl. ...................... 73/862.474; 73/862.451; 73/862.391
[58] Field of Search ........................ 73/828, 862.391, 73/862.473, 862.474, 862.451, 862.421, 862.472, 862.621

[56] References Cited

U.S. PATENT DOCUMENTS

| | | | |
|---|---|---|---|
| 3,965,737 | 6/1976 | Matthews | 73/828 |
| 4,171,640 | 10/1979 | Van Mastrigt | 73/862.451 |
| 4,182,167 | 1/1980 | Nakayama et al. | 73/862.474 |
| 4,295,360 | 10/1981 | Fountain | 73/862.474 |
| 4,825,702 | 5/1989 | Cizek | 73/828 |
| 5,275,062 | 1/1994 | Turley | 73/862.391 |
| 5,329,822 | 7/1994 | Hartel et al. | 73/862.391 |

FOREIGN PATENT DOCUMENTS

| | | |
|---|---|---|
| 28 39 328 A1 | 3/1980 | Germany . |
| 30 31 796 A1 | 4/1981 | Germany . |
| 35 06 698 A1 | 8/1986 | Germany . |
| 37 18 924 A1 | 12/1987 | Germany . |
| 36 37 922 A1 | 5/1988 | Germany . |
| 89 00 167 U1 | 6/1990 | Germany . |
| 04 25 005 A1 | 2/1992 | Germany . |
| 41 29 803 A1 | 3/1993 | Germany . |
| 43 00 633 A1 | 7/1993 | Germany . |
| 0 574 062 A1 | 12/1993 | Germany . |

*Primary Examiner*—Max H. Noori
*Attorney, Agent, or Firm*—Kennedy Covington Lobdell & Hickman LLP

[57] ABSTRACT

A device for measuring the tension of a traveling yarn, comprising two spaced-apart stationary yarn guide elements defining a yarn travel path therebetween and a measuring member disposed between the yarn guide elements and projecting into the yarn travel path to engage the yarn and react to tension changes therein. Each of the stationary guide elements has a yarn guide groove, and the movable measuring member comprises a yarn engagement body extending linearly in a direction substantially perpendicular to the yarn travel path. The yarn engagement body includes a central area with a yarn guide contour essentially convexly rounded in the direction of the yarn travel path and merging at opposite lateral ends of the central area with end areas essentially convexly rounded both in the direction of the yarn travel path and substantially perpendicular thereto.

8 Claims, 2 Drawing Sheets

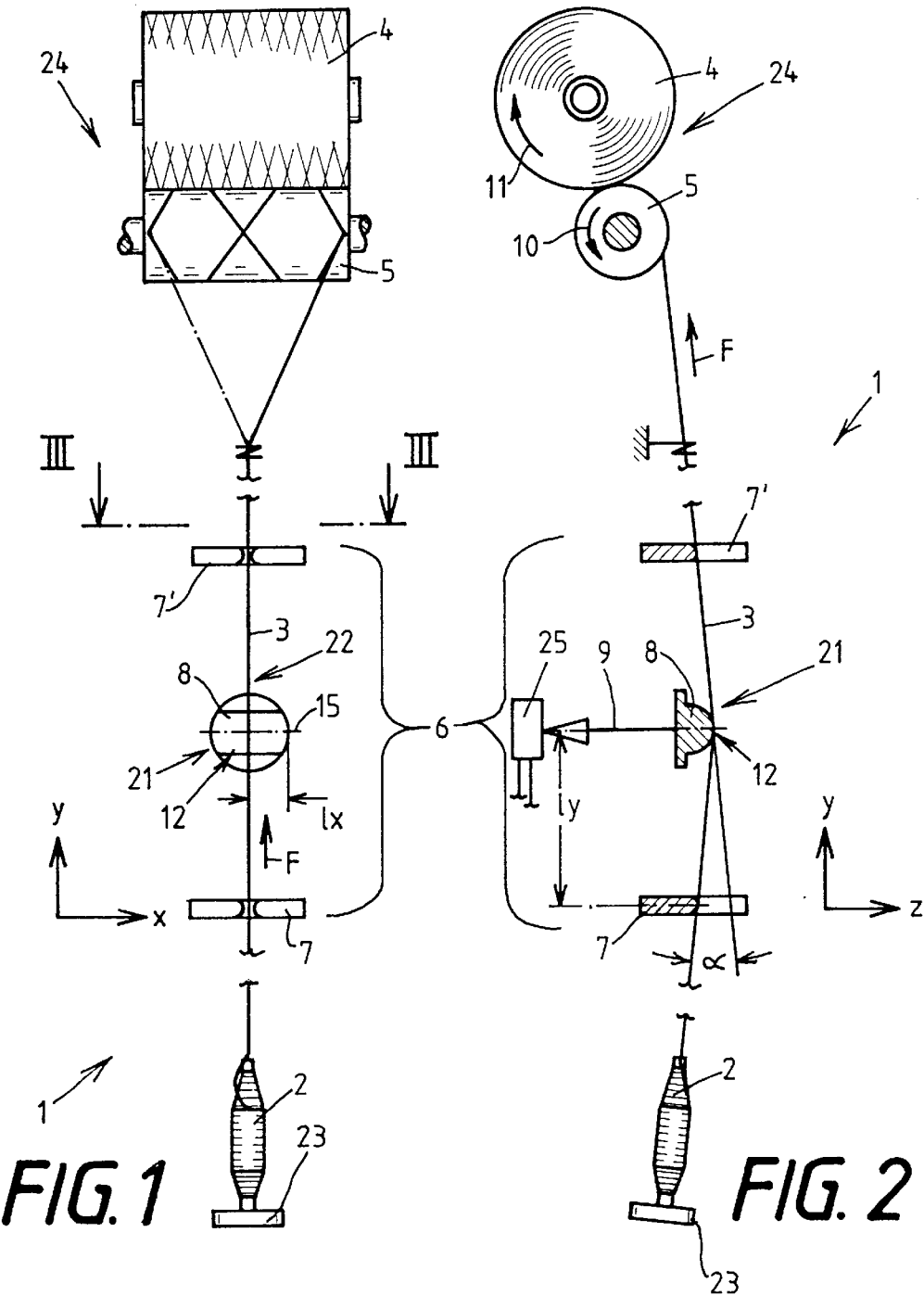
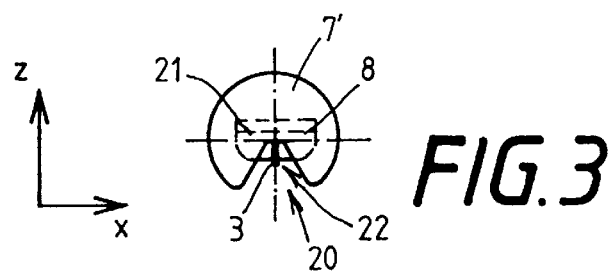
FIG. 1  FIG. 2
FIG. 3

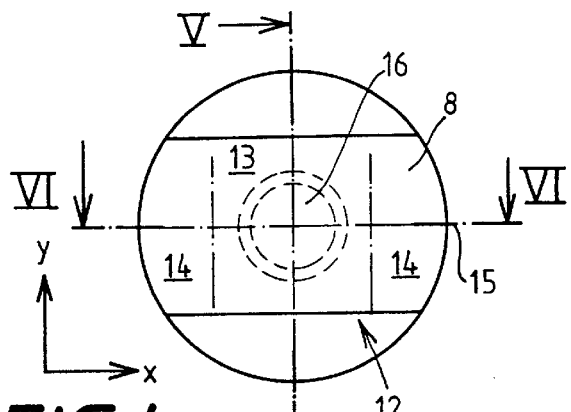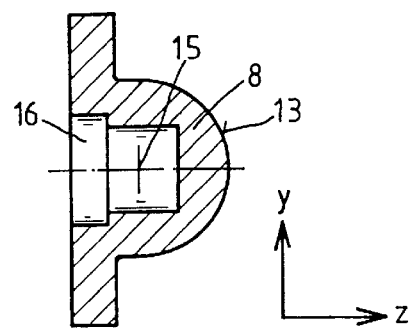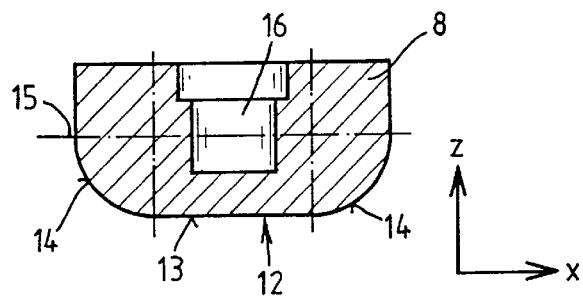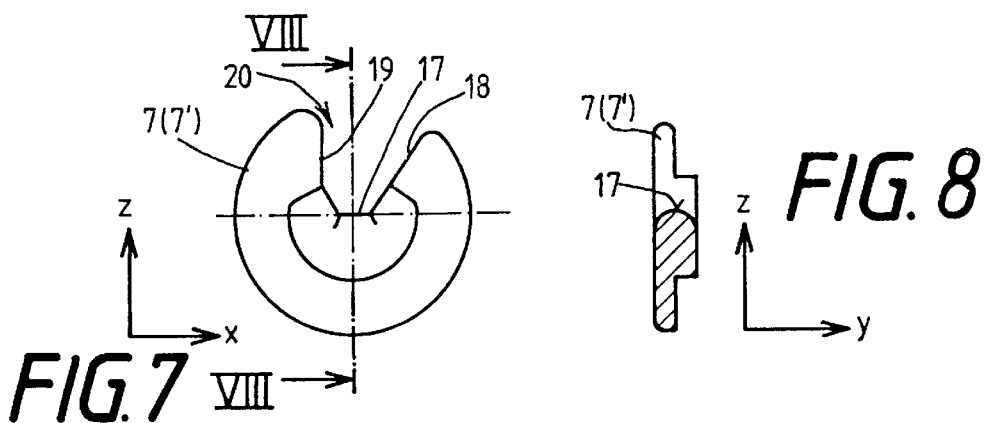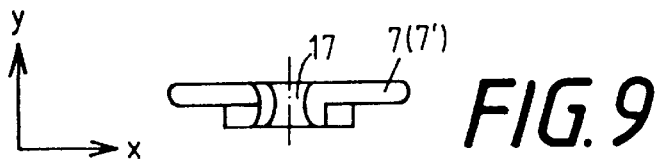

YARN TENSION MEASURING DEVICE FOR AUTOMATIC RETURN OF YARN FOLLOWING A MOMENTARY LOSS OF TENSION

FIELD OF THE INVENTION

The present invention relates to device for measuring the tension of a traveling yarn and, more particularly, to such devices utilizing two stationary yarn guide elements and a measuring member disposed between the yarn guide elements, which elements project into the traveling path of the yarn to be acted upon by the yarn.

BACKGROUND OF THE INVENTION

Yarn tension measuring devices of the basic type described above are known in various embodiments. With many operations in the textile industry, for example in the rewinding of a spinning cop on a large volume cheese, there is a requirement for maintaining the yarn tension approximately constant.

In automatic cheese winders, various suggestions have therefore previously been made and devices have been produced in the past for continuously regulating the yarn tension, for compensating for changes in yarn tension and for maintaining predetermined values of the yarn tension. Various control principles are known for this purpose which, depending on the requirements, can be applied independently of each other or in combination with each other.

One principle involves the regulation of the rotational speed (rpm) of the take-up bobbin in order to maintain the yarn tension essentially constant by adjusting the yarn tension during the work process.

Another principle for the regulation of yarn tension utilizes a disk brake system, for example, to provide the yarn with the desired tension while traveling onto the take-up bobbin by braking the yarn to a greater or lesser degree when passing through the brake disks in order to provide the desired tension.

The function of both systems consists in automatically regulating the values determining the yarn tension as a function of changes in the yarn tension by automatically compensating for every temporarily occurring difference in the yarn tension from a selected normal yarn tension. Thus, the sensing and, therefore, the measurement or control of the instantaneously prevailing yarn tension is a prerequisite for all regulating steps of these systems. In this connection, the total functioning and, particularly, the precision of the regulating system for maintaining the yarn tension constant is ultimately dependent on how accurately and with what amount of inertia the continuous control or measurement of the yarn tension can be performed.

A three point system is mainly employed for measuring the yarn tension of a traveling yarn, wherein the force of the yarn on a measuring eye which deflects the yarn is determined. To be able to make a determination of the tension from this force, the angle of contact of the yarn at the measuring eye must be known. So that this angle of contact is exactly maintained, the yarn rests on two further yarn guide elements, in addition to the measuring eye, which are also part of the yarn guide device. In this connection, it is known that with dynamically operating sensors the measuring eye should be as lightweight as possible in order to obtain a high threshold frequency of the sensor.

For example, a yarn tension measuring device is known from German Patent Publication DE 35 06 698 A1, which has a compact housing having stationary yarn guides in the form of small rollers disposed on the yarn inlet and outlet of the housing. A diabolo, which has a low coefficient of friction, is attached on a resilient sheet metal support piece, clamped on one end, at a defined angle to, and a defined distance from, these yarn guides. In this manner, the resilient sheet metal piece can be deflected by the effect of the yarn tension. A permanent magnet is fastened underneath the diabolo, also on a movable sheet metal piece, which follows every movement caused by the change in the yarn tension. A Hall sensor is stationarily fastened on the housing at a defined distance from the permanent magnet at the level of the magnet. Each movement of the magnet is registered by the Hall sensor, which is connected to a control device by means of an electric conductor so that the desired yarn tension is entered in the control device. With excessively high or excessively low tension, the control device transmits a signal which results, for example, in an adjustment of the yarn tension at the respective winding head.

German Patent Publication DE 40 25 005 A1 describes a device in which a semiconductor thin film pressure sensor is employed for measuring the yarn tension. In this case, this integrated circuit (IC) component is arranged inside a protective housing and is biased under pressure by means of a mechanical lever element which is in contact with the yarn. On its end, the lever element has a measuring eye in which the yarn slides. In addition, stationary yarn guides are disposed at a distance in advance of and following the movable measuring eye in the customary manner described.

Both the sensor device in accordance with German Patent Publication DE 40 25 005 A1 and the sensor device in accordance with German Patent Publication DE 35 06 698 A1 have the disadvantage that the yarn guide device of the yarn tension sensor is very sensitive to changes in the yarn tension, in particular abrupt losses of the yarn tension. In case of such abrupt losses of the yarn tension there is the danger that the yarn slides out of the movable, relatively small measuring eye or diabolo, which is open in order to make the insertion of the yarn possible, which results in a complete loss of function of the device, which can only be remedied by the manual intervention of an operator.

OBJECT AND SUMMARY OF THE INVENTION

In light of the above mentioned prior art, it is therefore an object of the present invention to further improve the known devices and avoid their disadvantages.

This object is attained in accordance with the present invention by providing a device for measuring the tension of a traveling yarn which basically comprises two spaced-apart stationary yarn guide elements defining a yarn travel path therebetween and a measuring member disposed between the yarn guide elements and projecting into the yarn travel path to engage the yarn and react to tension changes therein. Each of the stationary guide elements has a yarn guide groove, preferably of an essentially V-shape or another suitable configuration adapted to substantially retain the traveling yarn against lateral movements. The movable measuring member comprises a yarn engagement body with a convexly rounded yarn guide contour and particularly includes a central area with a yarn guide contour essentially convexly rounded in the direction of the yarn travel path and merging at opposite lateral ends of the central area with end areas essentially convexly rounded both in the direction of the yarn travel path and substantially perpendicular thereto. The yarn engagement body may have a linear extent in a direction substantially perpendicular to the yarn travel path.

This basic embodiment of a yarn guide device in accordance with the present invention to have two stationary yarn guide elements, each formed with a yarn guide groove preferably in a V-shape, and a movable measuring member whose yarn engaging body has a convexly embodied yarn guide contour, has the advantage that during a "normal" rewinding process the yarn always takes up a definite set position which, viewed from the front of the winding head, corresponds to the shortest possible distance between the yarn guide elements. When the yarn tension is normalized, the yarn automatically slides back into this set position, even following an abrupt loss in the yarn tension which generally leads initially to an increase in the yarn travel and thus to the deflection or curling of the yarn. No manual intervention or additional guide devices are required at all for this occurrence. A further advantage of the device in accordance with the present invention is that the yarn can be placed simply and assuredly into the yarn guide device of the yarn tension sensor.

In an advantageous embodiment, the dimension of the yarn guide contour of the central area in the direction of the yarn travel path is selected in relation to the distance of the measuring member from the yarn guide elements and in relation to the angle of contact of the yarn on the yarn engagement body. More specifically, the yarn guide contour of the central area meets the condition:

$$1_x > 1_y \times \tan\alpha/2$$

wherein $1_x$ represents one-half of the width of the central area in the direction perpendicular to the yarn travel path, $1_y$ represents the distance between the yarn engagement body and yarn guide element, and $\alpha$ represents the angle of contact of the yarn at the yarn engagement body.

Thus, the size of the yarn engagement body and particularly the width of its yarn guide contour is matched to the distance of the measuring member from the stationary yarn guide elements and to the angle of contact of the yarn at the yarn engagement body of the measuring member. In meeting the above-described requirements made for the arrangement and size of the yarn guide contour of the yarn engagement body, a yarn guide results wherein, on the one hand, in its set position the yarn automatically travels at an optimum rate and, on the other hand, disruptions which occur are self-corrected. It is furthermore assured that the yarn always remains on the measuring member, even with erratic traveling of the yarn.

In the preferred embodiment, the yarn engagement body has a semi-cylindrical shape in the central area and the center axis of the semi-cylindrical central area is arranged substantially perpendicularly to the yarn travel path, which advantageously assures the stable adherence of the traveling yarn about the rounded contour of the yarn engagement body during the rewinding process.

The preferred configuration of the yarn guide contour of the yarn engagement body to be straight in the center area and to merge into convexly shaped end areas on opposite sides prevents the yarn from remaining in a localized low area when it slides back into its set position. By means of such an embodiment it is further assured that the yarn engagement body does not have soiled corners or other areas which can become filled by collected fibers in a short time and lead to a distortion of the measurements.

According to a further feature of the invention, the measuring member has a receptacle open toward the rear in which the moving coil of an electromagnetic sensor of the yarn tension measuring device, for example, may be fixed. The exact design and functioning of such a sensor of the yarn tension is known and extensively described in German patent Publication DE 41 29 803 A1.

In the preferred embodiment, each of the yarn guide elements has a yarn guide groove defined by a groove bottom surface essentially straight as viewed in a direction substantially perpendicular to the yarn travel path and convexly curved in the direction of the yarn traveling path, a straight lateral surface and an opposing angled lateral surface, which accomplish a defined and gentle yarn treatment in the area of the yarn guide elements.

By means of this groove configuration for the yarn guide devices, yarn guide devices placed ahead or behind the measuring device in the direction of yarn travel, but not exactly aligned with one another, are prevented from lifting the yarn off the groove bottom surface of the stationary yarn guide elements, which would distort the tension measuring results. The convex curvature of the groove bottom surface in the direction of yarn travel results in a gentle yarn travel, which has positive effects on the quality of the yarn.

The provision of opposing straight and angled surfaces defining each groove offers advantages when a further sensor device with a relatively narrow threading slit, for example a yarn cleaner or the like, is disposed in advance of or following the yarn tension sensor. In such case, the angled leg of the yarn guide groove makes the automatic threading of the yarn into this yarn cleaner easier, while the straight leg assures that the yarn can be laid dependably into the stationary yarn guide elements of the yarn guide device of the yarn tension sensor.

Further details of the present invention will be understood from an exemplary embodiment explained hereinbelow with reference to the accompanying drawings.

BRIEF DESCRIPTION OF THE DRAWINGS

FIG. 1 is a front elevational view of a yarn guide device of a yarn tension sensor disposed at a winding head in a textile yarn winder;

FIG. 2 is a side elevational view of the yarn guide device of FIG. 1;

FIG. 3 is a top plan view of the yarn guide device of FIGS. 1 and 2 as viewed along line III—III in FIG. 1;

FIG. 4 shows the engagement body of the movable measuring member of the yarn tension sensor in a front view;

FIG. 5 is a cross-sectional view of the engagement body of FIGS. 1 and 2 taken along the section line V—V in FIG. 4;

FIG. 6 is another cross-sectional view of the engagement body taken along the section line VI—VI in FIG. 4;

FIG. 7 is a front elevational view of a stationary yarn guide element of the yarn guide device of FIGS. 1 and 2;

FIG. 8 is a cross-sectional view of the yarn guide element of FIG. 7 taken along the section line VIII—VIII therein; and FIG. 9 is a top view of the yarn guide element.

DETAILED DESCRIPTION OF THE PREFERRED EMBODIMENT

Referring now to the accompanying drawings and initially to FIGS. 1 and 2, one representative winding head 1 of a multi-station textile yarn winding machine for producing yarn cheeses, preferably an automatic cheese winder, is shown schematically in front elevational view. Basically, in the winder of FIG. 1, a yarn 3 is drawn off a spinning cop 2 placed in an unwinding position standing on a transport plate 23 and is rewound into a large volume cheese 4 at the winding head 1 in a known manner. As is customary, the cheese 4 is held in a creel (not shown) during the rewinding process and is driven in the direction of the arrow 11 by the frictional engagement of its outer circumference with a yarn guide drum 5 revolving in the direction of the arrow 10.

While traveling from the spinning cop 2 to the cheese 4, the yarn 3 passes through various control devices, which monitor the state of the yarn as well as the correct performance of the rewinding process. One of these control devices disposed in the area of the yarn travel path 22 is, for example, a yarn tension sensor 25, only schematically indicated in FIG. 2, having a yarn guide device identified as a whole by 6. More specifically, the yarn guide device 6 comprises two stationary yarn guide elements 7, 7' and a measuring member 21 movably supported between the yarn guide elements 7, 7' to be acted upon by the traveling yarn 3 in the direction of the arrow 9. For simplicity of illustration, a yarn engagement body 8 (described in greater detail below) is the only portion of this measuring member 21 represented in FIGS. 1 to 3, and in greater detail in FIGS. 4 to 6.

Referring now to FIGS. 4 to 6, the yarn engagement body 8 has a receptacle 16, open toward the rearwardly facing side of the body, in which is fixed a movable support element, for example a moving coil, of the schematically indicated yarn tension sensor 25. In addition, the yarn engagement body 8 has a forwardly projecting contoured yarn guide surface 12 extending widthwise across the body, the yarn guide surface 12 being formed with rounded laterally opposed end areas 14 merging with a main central area 13 therebetween. In this embodiment, the central area 13 has the shape of a semi-cylinder, whose center axis 15 extends in the direction of the X coordinate (see FIGS. 4 and 6) whereby the central area 13 is embodied to extend linearly in the direction of the X coordinate. The laterally adjoining edge areas 14 are convexly rounded. As represented in FIGS. 1 and 2, the dimensioning and the arrangement of the yarn engagement body 8 or of the yarn guide elements 7, 7' are selected such that the following condition is met:

$$1_x > 1_y \times \tan\alpha/2,$$

wherein $1_x$ represents one-half of the width of the yarn guide (i.e. in the direction of the x coordinate), $1_y$ represents the distance between the yarn engagement body and yarn guide element (i.e. in the direction of the y coordinate), and $\alpha$ is the angle of contact of the yarn at the yarn engagement body.

The yarn guide elements 7, 7' are represented in detail in FIGS. 7 to 9. As can be seen in particular in FIG. 7, each of the yarn guide elements 7, 7' has a yarn guide groove 20 extending in the direction of the y coordinate and opening forwardly in the direction of the z axis, the groove 20 being defined by a straight lateral surface 18, an angled lateral surface 19, and a bottom or rear surface 17, which is straight in respect to the X coordinate. The relatively wide groove bottom 17 is embodied to be convexly arched in the yarn traveling direction F.

The operation of the yarn guide device 6 may thus be understood. In traveling to the winding device 24, the yarn 3 drawn off a spinning cop 2 passes through the yarn guide device 6 of the yarn tension sensor 25 (among other devices). In the area of this yarn guide device 6, the yarn 3 travels in the V-shaped yarn guide grooves 20 of the stationary yarn guide elements 7 and 7' and, in traveling therebetween, acts on the yarn engagement body 8 of the measuring member 21 of the yarn tension sensor 25.

As represented in FIGS. 1 and 3, the yarn 3 moving in the yarn traveling direction F, is engaged angularly about the central area 13 of the yarn engagement body 8, transversely with respect to the orientation of the central area 13 along the X coordinate, and the yarn 3 normally remains stable in this traveling disposition during "normal" rewinding operations.

If a sudden increase in the extent of the yarn between the yarn guide elements 7, 7' occurs because of an abrupt yarn tension loss, the yarn 3 usually comes out of contact with the measuring member 21 and curls or moves laterally next to the yarn guide contour 12 of the measuring member 21, for example. Subsequently, such an occurence is countered by means of a control device, for example a yarn brake or the like, so that the loss of yarn tension is compensated. Because of the configuration and arrangement of the yarn guide device 6, particularly that of its yarn engagement body 8, the yarn 3 once braked then slides automatically into its set position on the measuring member 21 in the process, so that the rewinding process can be continued without manual intervention.

The invention is not limited to the exemplary embodiment represented and described herein. Other yarn tension sensors than the yarn tension sensor described in German Patent Publication DE 41 29 803 A1 can easily be used in connection with the described yarn guide device, for example mechanical yarn tension sensors, without departing from the general concept of the present invention of a dependable yarn guide preferably located in the area of the yarn tension sensor and self-correcting in case of a loss of yarn tension.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A device for measuring the tension of a traveling yarn traveling in a direction along a predetermined yarn path and for automatically returning the traveling yarn to the predetermined yarn path following a momentary loss of yarn tension, comprising:

two spaced-apart stationary yarn guide elements each having a yarn guide groove and a movable measuring member disposed therebetween to define the predetermined yarn travel path, the movable measuring member engaging the traveling yarn along the yarn travel path and reacting to tension changes therein, wherein the movable measuring member includes a yarn engagement body having a central area and opposite lateral end areas defining a continuous yarn guide contour, the yarn guide contour defined by the central area being essentially convexly rounded in the direction of the yarn travel path and the yarn guide contour defined by the end areas being essentially convexly rounded both in the direction of the yarn travel path and in a lateral direction substantially perpendicular thereto and extending between the lateral end areas, and wherein one-half of the width of the yarn engagement body in the lateral direction is greater than the product of the tangent of one-half of the angle of contact of the yarn at the yarn engagement body and the distance between the yarn engagement body and one of the yarn guide elements, whereby, following a momentary loss of yarn tension and disengagement of the traveling yarn from the yarn engagement body, the yarn guide elements and yarn guide contour automatically return the traveling yarn to the predetermined yarn path.

2. The yarn tension measuring device in accordance with claim 1, wherein the yarn engagement body extends linearly in said lateral direction substantially perpendicular to the yarn travel path.

3. The yarn tension measuring device in accordance with claim 1, wherein the yarn guide groove of each of the stationary guide elements is essentially V-shaped.

4. The yarn tension measuring device in accordance with claim 1, wherein the yarn engagement body has a semi-cylindrical shape in the central area and wherein the center axis of the semi-cylindrical central area is arranged substantially perpendicular to the yarn travel path.

5. The yarn tension measuring device in accordance with claim 1, wherein the yarn engagement body of the measuring member has a receptacle open at the rear.

6. The yarn tension measuring device in accordance with claim 1, wherein each of the yarn guide elements has a yarn guide groove with a groove bottom surface which is essentially straight as viewed in a direction substantially perpendicular to the yarn travel path.

7. The yarn tension measuring device in accordance with claim 6, wherein the bottom surface of the yarn guide groove is convexly curved in the direction of the traveling yarn path.

8. The yarn tension measuring device in accordance with claim 6, wherein the yarn guide groove of each of the yarn guide elements is defined by a straight lateral surface and an angled lateral surface.

* * * * *